(12) United States Patent
Oono et al.

(10) Patent No.: US 9,505,075 B2
(45) Date of Patent: Nov. 29, 2016

(54) TIG WELDING METHOD OF FERRITE STAINLESS STEEL SHEET

(71) Applicant: TAIYO NIPPON SANSO CORPORATION, Tokyo (JP)

(72) Inventors: Hiroki Oono, Kai (JP); Katsunori Wada, Kai (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 367 days.

(21) Appl. No.: 14/352,115

(22) PCT Filed: Oct. 18, 2012

(86) PCT No.: PCT/JP2012/076958
§ 371 (c)(1),
(2) Date: Apr. 16, 2014

(87) PCT Pub. No.: WO2013/058321
PCT Pub. Date: Apr. 25, 2013

(65) Prior Publication Data
US 2014/0246406 A1 Sep. 4, 2014

(30) Foreign Application Priority Data

Oct. 19, 2011 (JP) ................................. 2011-229533

(51) Int. Cl.
*B23K 9/00* (2006.01)
*B23K 9/167* (2006.01)
*B23K 9/23* (2006.01)

(52) U.S. Cl.
CPC ................ *B23K 9/167* (2013.01); *B23K 9/23* (2013.01); *B23K 2203/04* (2013.01)

(58) Field of Classification Search
CPC .... B23K 9/167; B23K 9/23; B23K 2203/04; B23K 9/00; B23K 35/0266; B23K 9/12; B23K 9/1336; B23K 9/173; B23K 9/323; H05H 1/00
USPC ............................ 219/74, 50, 136, 137 R, 75
See application file for complete search history.

(56) References Cited

U.S. PATENT DOCUMENTS 3,604,889 A * 9/1971 Rohrberg ............... B23K 10/02
219/121.45
4,680,440 A * 7/1987 Barlet ..................... B23K 9/291
219/137 R (Continued)

FOREIGN PATENT DOCUMENTS

CN 1126646 A 7/1996
JP A-58-035071 3/1983

(Continued)

OTHER PUBLICATIONS

Stainless Steel ASM Material Data Sheet.*

(Continued)

*Primary Examiner* — Justin Jonaitis
(74) *Attorney, Agent, or Firm* — Nixon & Vanderhye P.C.

(57) ABSTRACT

A TIG welding method for a ferrite stainless steel sheet is disclosed, wherein a first shield gas is used wherein the gas is a mixture of argon gas and helium gas, 20 to 90% by volume of helium is included in the mixture, and the flow rate $S_1$ of the first shield gas is set in a range of 0.175 m/sec $\leq S_1 \leq$ 1.75 m/sec, and a second shield gas is used wherein the gas is argon gas, and the flow rate $S_2$ of the second shield gas is set in a range of 0.05 m/sec $\leq S_2 \leq$ 1.51 m/sec.

16 Claims, 1 Drawing Sheet

(56) References Cited

U.S. PATENT DOCUMENTS

| | | | | |
|---|---|---|---|---|
| 5,714,729 | A * | 2/1998 | Yamada | B23K 9/0213 219/136 |
| 6,040,545 | A * | 3/2000 | Taki | B23K 9/0213 219/137 R |
| 6,392,184 | B1 * | 5/2002 | Yokota | B23K 9/295 219/74 |
| 2009/0107970 | A1 * | 4/2009 | Norrish | B23K 9/167 219/137 R |
| 2010/0108645 | A1 * | 5/2010 | Viard | B23K 9/325 219/74 |
| 2013/0277337 | A1 * | 10/2013 | Murata | B23K 9/167 219/74 |

FOREIGN PATENT DOCUMENTS

| | | |
|---|---|---|
| JP | 06-297149 | 10/1994 |
| JP | 07-227673 | 8/1995 |
| JP | 09-010943 | 1/1997 |
| JP | 11-229034 | 8/1999 |
| JP | A-2003-019564 | 1/2003 |
| JP | A-2003-236661 | 8/2003 |
| JP | 2008-200750 | 9/2008 |
| JP | 2008-221266 | 9/2008 |

OTHER PUBLICATIONS

Oct. 20, 2015 Decision of Rejection issued in Japanese Patent Application No. 2011-229533 (with translation).

Jul. 8, 2015 Office Action issued in Chinese Patent Application No. 201280051066.2 (with partial translation).

International Search Report for PCT/JP2012/076958, mailed Dec. 18, 2012.

* cited by examiner

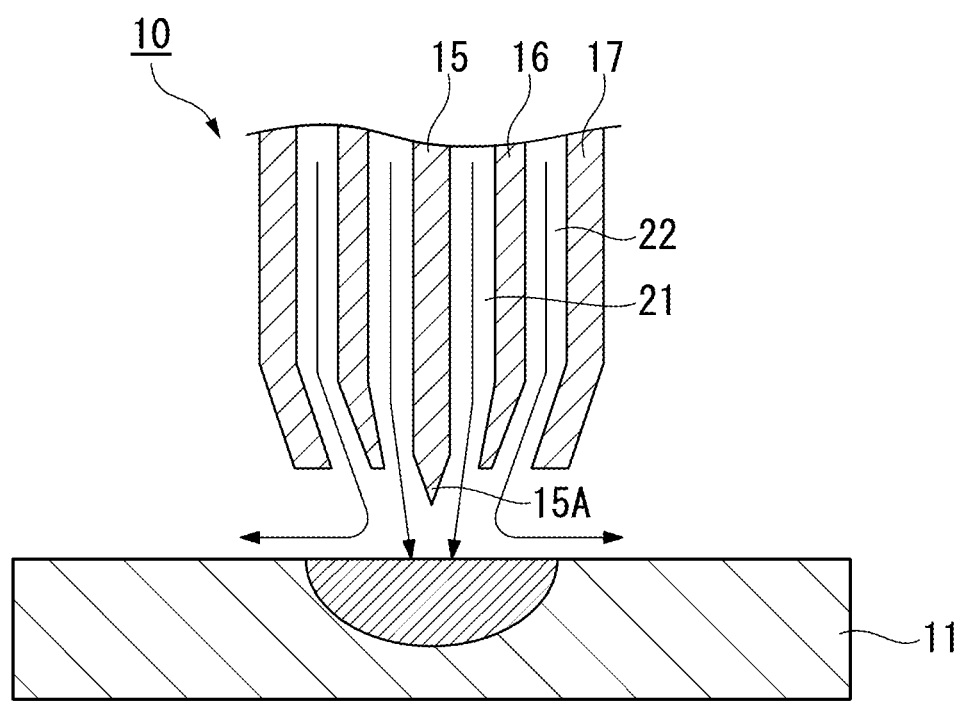

TIG WELDING METHOD OF FERRITE STAINLESS STEEL SHEET

TECHNICAL FIELD

This application is the U.S. national phase of International Application No. PCT/JP2012/076958 filed 18 Oct. 2012 which designated the U.S. and claims priority to Japanese Patent Application No. 2011-229533, filed Oct. 19, 2011, the entire contents of each of which are incorporated herein by reference.

BACKGROUND ART

Conventionally, TIG welding (tungsten inert gas welding) which uses a double-shielding structure type welding torch has been performed, and the welding torch includes a tungsten electrode, a first shield nozzle which surrounds the tungsten electrode, and a second shield nozzle which is placed at the outside of the first shield nozzle, wherein a first shield gas is supplied from the inner side of the first shield nozzle, and a second shield gas is supplied from an area between the first shield nozzle and the second shield nozzle. (For example, refer to Patent documents 1 to 3.)

Generally, argon is used in TIG welding as a shield gas from the viewpoint of molten pool protection.

In Patent document 1, the TIG welding method described below is disclosed. In the method, a tungsten electrode of a welding torch is inserted into a groove of an object to be welded having the groove, and voltage is applied to an energization part of the tungsten electrode while flowing a shielding gas so that a molten pool is formed due to a welding arc generated between the tungsten electrode and the object to be welded. Then, a welding wire, which is fed out from the welding torch, is entered in the generated molten pool, and the welding torch is moved to perform welding. In the welding, an inner shielding gas and an outer shielding gas are used. The inner shielding gas is fed from the circumference of the tungsten electrode toward the terminal end of the electrode. The outer shielding gas consists of two flows, wherein one flow is fed from the outside of the inner shield gas toward a groove to prevent the oxidation of the molten pool, and the other flow is fed to prevent the entrapment of oxygen, which is included in air supplied from the outside, into the welding article.

Furthermore, Patent document 1 discloses that argon gas including 2 to 10% by volume of hydrogen or argon gas including 10 to 80% by volume of helium is used as the inner shield gas and the outer shield gas to increase penetration depth.

Patent document 2 discloses a double-shielded-type TIG welding method wherein the welding is performed with a first shield gas which surrounds a tungsten electrode and with a second shield gas which surrounds the first shield gas. In the method, the welding is performed by using helium gas as the first shield gas at the flow rates of 6 to 10 L/min and using argon gas as the second shield gas at the flow rate of 10 to 30 L/min.

Patent Document 3 discloses a double-shielded-type TIG welding method wherein, a flow density of an inner shield gas ejected from an inner nozzle of a torch, which is used for the double-shielded-type TIG welding, is adjusted to a value in a certain range, and then arc is generated to an electrode so that a welding portion is welded. As an example of the inner shield gas, it is described that argon gas including 5% of hydrogen is used.

Furthermore, Patent document 3 discloses that, when the flow density of the inner shield gas is in a range of 0.1 to 0.2 L/min·mm², variations of the penetration depth can be included in a 0.5 mm range.

Here, when the flow density of an inner shield gas is 0.1 L/min·mm², a flow rate V of the inner shield gas obtained by a conversion of 0.1 L/min·mm² is as follows.

$$V=(0.1\times1000\times1000)/(60\times1000)\approx1.66(\text{m/sec})$$

Furthermore, when the flow density of an inner shield gas is set to 0.2 L/min·mm², the flow rate V of the inner shield gas is 3.3 m/sec.

In a case that TIG welding is performed for a ferrite stainless steel sheet using the aforementioned welding torch having a double-shielded structure and a penetration depth of the welding is set to become deep, it is difficult to use argon gas, which is described in Patent document 1 and includes hydrogen, as a shield gas from the viewpoint of hydrogen embrittlement and low temperature cracking. Accordingly, argon gas including helium is appropriately used for such welding.

On the other hand, a ferrite stainless steel sheet has a characteristic wherein such a sheet is low in price as compared with other stainless steel sheets.

However, when argon gas including helium described in Patent document 1 is used for an inner shield gas and an outer shield gas, there is a problem that costs for TIG welding increase since helium is expensive.

Furthermore, when argon gas including helium is used for an inner shield gas and an outer shield gas, the specific gravities of the inner shield gas and the outer shield gas decrease due to the effect of helium, and improper shielding tends to be cased. In order to inhibit improper shielding, it is necessary to supply a large amount of argon gas including helium, and therefore, there is a problem in that the cost required for a TIG welding for a ferrite stainless steel sheet further increases. In addition, Patent document 1 does not disclose a ferrite stainless steel sheet.

Patent document 2 discloses that helium gas (single helium gas) is used as a first shield gas which surrounds a tungsten electrode. However, helium has the high ionization potential.

Accordingly, it is difficult to generate arc, and therefore, the closer the mixing ratio of helium in the first shield gas is to that of a single helium gas, the more an arc temperature of a position which is directly under a tungsten electrode increases, and consumption of a tungsten electrode increases.

Accordingly, there is a problem that the cost required for TIG welding which is performed for a ferrite stainless steel sheet furthermore increases.

Furthermore, when a flow rate of the inner shield gas is set in a range of 1.66 to 3.33 m/sec as described in Patent document 3, irregular beads may be generated since the flow rate of the inner shield gas is too fast.

In addition, Patent document 3 does not disclose a flow rate of an outer shield gas at all. For example, when a flow rate of an outer shield gas is too fast, the helium concentration at the arc area does not achieve an appropriate value, but be a considerably small value.

Furthermore, when a flow rate of an outer shield gas is too slow, a bead appearance becomes poor due to insufficient shielding capacity, and oxidation and the like are caused. Patent document 3 does not disclose a flow rate of an outer shield gas at all.

BACKGROUND ART DOCUMENTS

Patent Documents

Patent Document 1: Japanese Unexamined Patent Application, First Publication No. Hei 9-10943
Patent Document 2: Japanese Unexamined Patent Application, First Publication No. Hei 7-227673
Patent Document 3: Japanese Unexamined Patent Application, First Publication No. Hei 6-297149

DISCLOSURE OF INVENTION

Problem to be Solved by the Invention

The purpose of the present invention is to provide a TIG welding method for a ferrite stainless steel sheet, wherein the welding method uses a double-shield type welding torch which can supply a first shield gas and a second shield gas, can reduce cost, can increase a shield effect to inhibit oxidation, and can obtain sufficient penetration depth.

Means for Solving the Problems

In order to solve the aforementioned problem, the present invention provides the following method.
A first aspect of the present invention is a TIG welding method for a ferrite stainless steel sheet, wherein the method uses a welding torch, and
the welding torch includes:
an electrode which has a tip which generates arc;
a first shield nozzle which surrounds the electrode; and
a second shield nozzle provided at the outside of the first shield nozzle; wherein
a first shield gas is supplied from the inside of the first shield nozzle toward the tip of the electrode,
a second shield gas is supplied from an area between the first shield nozzle and the second shield nozzle toward the tip of the electrode;
the first shield gas is a mixed gas which is a mixture of argon gas and helium gas, wherein 20 to 90% by volume of helium is included in the mixture, and the flow rate $S_1$ of the first shield gas is set to 0.175 m/sec≤$S_1$≤1.75 m/sec, and
the second shield gas is argon gas, and the flow rate $S_2$ of the second shield gas is set to 0.05 m/sec≤$S_2$≤1.51 m/sec.
In the present invention, it is preferable that the flow rate $S_1$ be set to 0.35 m/sec≤$S_1$≤1.58 m/sec, and the flow rate $S_2$ be set to 0.24 m/sec≤$S_2$≤1.21 m/sec.
Furthermore, in the present invention, it is preferable that the mixed gas include 25 to 75% by volume of helium gas.

Effects of the Invention

Due to the TIG welding method for a ferrite stainless steel sheet of the present invention, it is possible to reduce costs required for the TIG welding method for a ferrite stainless steel sheet as compared with a case wherein helium is merely used as a first shield gas, since the first shield gas is a mixture of argon gas and helium gas, and the mixture includes 20 to 90% by volume of helium gas.
Furthermore, since the first shield gas is a mixture including argon gas and 20 to 90% by volume of helium gas, an arc temperature generated directly under the tungsten electrode is prevented from being excessively raised. Accordingly, the consumption of the tungsten electrode can be prevented, it is possible to reduce costs required for a TIG welding method for a ferrite stainless steel sheet, and the sufficient penetration depth can be achieved.
When the flow rate $S_1$ of the first shield gas is set to 0.175 m/sec≤$S_1$≤1.75 m/sec, the flow rate $S_1$ becomes at an adequate value and the generation of irregular beads can be prevented. Accordingly, welding for a ferrite stainless steel sheet can be accurately performed.
Furthermore, since argon gas is merely used as the second shield gas, it is possible to reduce costs required for a TIG welding method for a ferrite stainless steel sheet as compared with a case wherein a shield gas which is a mixture of helium gas and argon gas is used as a second shield gas. In addition, shield effects are also improved.
Furthermore, when the flow rate $S_2$ of the second shield gas is set to 0.05 m/sec<$S_2$≤1.51 m/sec, the helium concentration at the arc part can be set to an appropriate value, and it is possible to obtain shield effects to inhibit oxidation. Therefore, excellent bead appearance is achieved.

BRIEF DESCRIPTION OF THE DRAWINGS

FIG. 1 is a cross sectional view which shows a main part of an example of a double-shielded-type welding torch which can be applied to the TIG welding method for a ferrite stainless steel sheet.

BEST MODE FOR CARRYING OUT THE INVENTION

Hereinafter, an embodiment to which the present invention is applied is explained in detail with reference to the FIGURE. Here, the FIGURE used for the explanation described below is provided to explain the structure of the embodiment of the present invention. Size, thickness, length and the like of each part shown in the FIGURE may be different form the actual dimensional relationship of the double-shielded-type welding torch. It should be understood that the present invention is not limited to the examples described below, and additions, omissions, substitutions and other modifications with respect to the structure can be made without departing from the scope of the present invention.
(Embodiment)
FIG. 1 shows a cross-sectional view of a main part of a double-shielded-type welding torch used for a TIG welding method for a ferrite stainless steel sheet.
A stainless steel is an alloy steel wherein chromium has been added to iron, and a special element selected from molybdenum, copper, aluminum, niobium and titanium is further added as required. A ferrite stainless steel sheet generally includes a small amount of carbon, and for example, includes 0.3% or less, preferably 0.15% or less of carbon. In the present invention, a ferrite stainless steel sheet may mean a stainless steel including 10% or more, preferably 16% or more of chromium. Examples of an amount of chromium include: 11%, 12%, 13%, 15%, 16%, 17%, 18%, 19%, 21%, 22%, 28% and the like. In this way, the amount of chromium is generally from about 11 to 28%, and the amount thereof can be selected as necessary. For example, the amount may be about from 11 to 13%, 16 to 19%, or 16 to 19 based on the target properties. Here, the upper limit of the amount of chromium is optionally limited, and it is generally 30% or less, and preferably 29% or less.
In the present invention, a ferrite stainless steel sheet can be optionally selected. For example, SUS405, SUS409, SUS409L, SUS410L, SUS410Ti, SUS429, SUD430, SUS430F, SUS4301X, SUS430J1L, SUS434, SUS436L, SUS436J1L, SUS444, SUS445J1, SUS445J2, SUS447J1, SUSXM8, SUSXM27, SUH21, SUH409, SUH409L, SUH446 and the like can be cited as the kinds thereof. However, a ferrite stainless steel sheet is not limited to the examples. Here, "SUS" is abbreviation of "steel use stainless", and "SUH" is abbreviation of "steel use heat resisting".

First, while referring to FIG. 1, the structure of a double-shielded-type welding torch 10, which is applied to a TIG welding method for a ferrite stainless steel sheet, is explained.

The double-shielded-type welding torch 10 has an electrode 15, a first shield nozzle 16 and a second shield nozzle 17.

The electrode 15 has a tip 15A which generates arc. As the electrode 15, a tungsten electrode can be used.

A first shield nozzle 16 has a tubular form and is provided at the outside of the electrode 15. As shown in the FIGURE, a lower terminal end thereof may be inclined to the inner side. A nozzle diameter of the first shield nozzle can be optionally changed and selected according to the nozzle form thereof, other attachments and the like. For example, an usable inner diameter (inner diameter of an outlet) is generally about 5 mm to 15 mm, and 6.5 mm to 12.5 mm cm is more preferable. However, the present invention is not limited to the range.

A first flow 21, which is used to supply the first shield gas to a tip 15A of the electrode 15, is provided between the first shield nozzle 16 and the electrode 15.

A second shield nozzle 17 has a tubular form, and is provided at the outside of the first shield nozzle 16. As shown in the FIGURE, a lower terminal end may be inclined at the inner side. The inner diameter of the outer nozzle should be larger than the outer diameter of the inner nozzle, and can be determined as needed.

The lower end of the first shield nozzle 16 and the lower end of the second shield nozzle 17 are almost parallel to each other. The tip of the electrode 15 protrudes from the nozzle. These conditions of the electrode can be changed in so far as the effects of the present invention are obtained. The protruded length of the electrode can be selected optionally. For example, the lower limit thereof is preferably 0 mm or more, and may be 10 mm or more. The upper limit can be selected optionally, and for example, it may be 15 mm or less, and may be 20 mm or less, or 25 mm or less. The diameter of the electrode can be selected optionally, and is generally 1.6 mm or more and 5.0 mm or less, and more preferably 2.4 mm or more and 4.0 mm or less.

The distance between the inner surface of the second shield nozzle 17 and the outer surface of the first shield nozzle 16 can be optionally selected.

As the first shield gas, a gas which is a mixture of argon gas and helium gas, wherein 20 to 90% by volume of helium is included in the mixture, can be used.

Due to the characteristics, it is possible to reduce costs required for the TIG welding for a ferrite stainless steel sheet as compared with a case wherein helium gas is merely used as a first shield gas.

Furthermore, it is more preferable that 25 to 75% by volume of helium gas be included in the first shield gas (mixture gas). When the volume of helium gas included in the first shield gas (mixture gas) is set to 25 to 75% by volume, it is possible to obtain a stabilized and sufficient penetration depth, and also possible to stably generate arc.

Here, "a stabilized and sufficient penetration depth" means a case wherein a width of a penetration bead is 2 mm or more.

The ratio of helium gas included in the first shield gas can be selected as needed in so far as the ratio is included in the aforementioned range. Accordingly, the lower limit of the volume of helium gas can be selected according to the conditions. For example, it may be selected from 20% by volume or more, 25% by volume or more, 30% by volume or more, 35% by volume or more, 40% by volume or more, 50% by volume or more, and 60% by volume or more. The upper limit of the volume of helium gas can be selected according to the conditions. For example, it may be selected from 90% by volume or less, 85% by volume or less, 80% by volume or less, 75% by volume or less, 70% by volume or less, 60% by volume or less, and 65% by volume or less. Concretely, the ratio of helium gas included in the first shield gas may be 30 to 80% by volume, 40 to 90% by volume, 20 to 50% by volume, 50 to 90% by volume, or 75 to 90% by volume as needed.

Furthermore, since a mixed gas including argon gas and 20 to 90% by volume of helium gas is used as the first shield gas, an arc temperature generated directly under the electrode 15 is prevented from being excessively raised, and consumption of the electrode 15 can be prevented. Accordingly, it is possible to reduce costs required for a TIG welding method of the ferrite stainless steel sheet 11, and the sufficient penetration depth can be achieved.

When a ratio of helium gas is less than 20% by volume, a problem tends to be caused wherein a penetration depth is shallow, and when a ratio of helium gas exceeds 90% by volume, problems tend to be caused wherein a state of generating arc is poor.

When the flow rate $S_1$ (first flow rate) of the first shield gas is slower than 0.175 m/sec, stable stirring of a molten pool cannot be performed, and sufficient penetration depth cannot be obtained. Furthermore, when the flow rate is larger than 1.75 m/sec, a molten pool is excessively stirred and irregular beads are generated.

Accordingly, the flow rate $S_1$ of the first shield gas is preferably set in a range shown by 0.175 m/sec≤$S_1$≤1.75 m/sec. Due to the characteristics, the flow rate $S_1$ is set to an appropriate value, and it is possible to prevent generation of irregular beads. Accordingly, welding of the ferrite stainless steel sheet 11 can be accurately performed.

The upper limit and the lower limit of the flow rate $S_1$ can be optionally set in so far as the value is included in the aforementioned range. For example, it is preferable that the lower limit of the flow rate $S_1$ be 0.35 m/sec or more, more preferably 0.526 m/sec or more, and still more preferably 0.702 m/sec or more. It is preferable that the upper limit of the flow rate $S_1$ be, for example, 1.58 m/sec or less, 1.40 m/sec or less, and still more preferably 1.23 m/sec or less.

A second shield nozzle 17 is provided at the outside of the first shield nozzle 16 so that the first shield nozzle 16 is surrounded by the second shield nozzle. A second channel 22, which supplies the first shield gas toward a tip 15A of the electrode 15, is provided between the first shield nozzle 16 and the second shield nozzle 17.

Argon gas is merely used as the second shield gas. When argon gas is merely used as the second shield gas, it is possible to reduce costs required for the TIG welding method for a ferrite stainless steel sheet 11 as compared with a case wherein a shield gas which is a mixture of helium and argon gas is used as a second shield gas, and it is possible to improve the shield effects which is used for inhibiting oxidation.

When the second shield gas does not flow or when the amount of the second shield gas is too small, that is, when the flow rate $S_2$ of the second shield gas is lower than 0.05 m/sec, insufficient shield effect is obtained since the amount of gas used for protecting bead is small. As the result, bead is oxidized, and the electrode is consumed.

Furthermore, when the flow rate $S_2$ of the second shield gas exceeds 1.51 m/sec, the second shield gas is mixed with the first shield gas, and an irregular bead is generated wherein a start end is not aligned.

Accordingly, it is preferable that the flow rate $S_2$ (second flow rate) of the second shield gas be set to a range of 0.05 m/sec<$S_2$≤1.51 m/sec.

When the flow rate $S_2$ of the second shield gas is set in a range of 0.05 m/sec<$S_2$≤1.51 m/sec, the concentration of helium at the arc part can be set to an appropriate value, and it is possible to obtain a sufficient shield effect. Therefore, excellent bead appearance is achieved.

The upper limit and the lower limit of the flow rate $S_2$ can be set optionally in so far as the value is included in the aforementioned range. For example, it is preferable that the lower limit of the flow rate $S_2$ be 0.18 m/sec or more, more preferably 0.24 m/sec or more, and still more preferably 0.30 m/sec. For example, it is preferable that the upper limit of the flow rate $S_2$ be 1.21 m/sec or less, 0.91 m/sec or less and still more preferably 0.60 m/sec.

Furthermore, it is preferable that the flow rate $S_1$ of the first shield gas be set to 0.35 m/sec≤$S_1$≤1.58 m/sec, and the flow rate $S_2$ of the second shield gas be set to 0.18 m/sec≤$S_2$≤1.21 m/sec.

Furthermore, it is more preferable that the flow rate $S_1$ be set to 0.35 m/sec≤$S_1$≤1.58 m/sec, and the flow rate $S_2$ is set to 0.24 m/sec≤$S_2$≤1.21 m/sec.

When such a condition is used, for example, the flow rate $S_1$ is set to 0.35 m/sec≤$S_1$≤1.58 m/sec and the flow rate $S_2$ is set to 0.24 m/sec≤$S_2$≤1.21 m/sec, a stable penetration depth is achieved and a bead starting end which is shielded appropriately can be stably provided.

In the embodiment, a TIG welding of the ferrite stainless steel sheet 11 is performed using the double-shielded-type welding torch 10 having the above structure, such that; a mixed gas of argon gas and helium gas, wherein 20 to 90% by volume of helium is included in the mixed gas, is used as the first shield gas; the flow rate $S_1$ of the first shield gas is set to 0.175 m/sec≤$S_1$≤1.75 m/sec; argon gas is used as the second shield gas; and the flow rate $S_2$ of the second shield gas is set to 0 m/sec<$S_2$≤1.51 m/sec.

The TIG welding method for a ferrite stainless steel sheet of the embodiment uses a mixed gas including argon gas and 20 to 90% by volume of helium gas as the first shield gas. The mixed gas includes 20 to 90% by volume of helium. Accordingly, it is possible to reduce costs required for a TIG welding of the ferrite stainless steel sheet 11 as compared with a case wherein helium is merely used as the first shield gas.

Furthermore, since the mixed gas of argon gas and helium gas is used as the first shield gas, an arc temperature generated directly under the electrode 15 is prevented from being excessively raised, and the consumption of an electrode 15 can be prevented. Accordingly, it is possible to reduce costs required for a TIG welding method of the ferrite stainless steel sheet 11, and the sufficient penetration depth can be achieved.

Furthermore, when the flow rate $S_1$ of the first shield gas is set to 0.175 m/sec≤$S_1$≤1.75 m/sec, the first flow rate $S_1$ is set to an appropriate value, and it is possible to prevent the generation of irregular beads. Accordingly, welding for a ferrite stainless steel sheet 11 can be accurately performed.

Furthermore, when argon gas is merely used as the second shield gas, it is possible to reduce costs required for the TIG welding method of the ferrite stainless steel sheet 11 as compared with a case wherein a second shield gas is a mixture of helium and argon gas. Furthermore, it is possible to improve shield effects used to inhibit oxidation.

Furthermore, when the flow rate $S_2$ of the second shield gas is set to 0.05 m/sec<$S_2$≤1.51 m/sec, the helium concentration at an arc part can be set to an appropriate value, and it is possible to obtain a shield effect to inhibit oxidation. Accordingly, it is possible to excellent bead appearance.

The preferable embodiments of the present invention have been described above. However, the present invention is not limited merely to such specific embodiments. Various modifications and changes are possible insofar as such modifications and changes are included in a range of the content of the present invention described in claims.

EXAMPLES

Hereinafter, the effect of the present invention will be concretely explained with reference to Examples and Comparative Examples. However, the invention is not limited to the following Examples.

(Evaluations of Examples 1 to 5 and Comparative Examples 1 and 2, wherein the influence of a ratio of helium gas, which was included in the first shield gas, on the welding results were evaluated)

Comparative Example 1

Evaluation of Comparative Example 1 was performed using a first shield gas, wherein a helium ratio thereof was smaller than that of the present invention. Concretely, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of the consumption of an electrode, and generation state of arc (starting property of arc) were performed.

Here, the electrode diameter of the torch shown in FIG. 1 was 2.4 mm, the inner diameter of the inner nozzle was 9.5 mm, the outer diameter of the inner nozzle was 14 mm, the inner diameter of the outer nozzle was 25 mm, and the outer diameter of the outer nozzle was 28 mm. The electrode was protruded from the nozzle, and the projection length of the electrode was 3 mm.

Here, a first shield gas which was "Ar-15% by volume of He" (a mixed gas including argon and 15% by volume of helium gas) was used, and 0.35 m/sec was used as the flow rate $S_1$ (first flow rate) of the gas. A second shield gas which was Ar (single argon gas) was used, and 0.60 m/sec was used as the flow rate $S_2$ (second flow rate) of argon gas. Evaluation results of Comparative Example 1 are shown in Table 1.

TABLE 1

| | Evaluation items | | | |
|---|---|---|---|---|
| | Penetration depth | Occurrence or non-occurrence of oxidation of bead | Occurrence or non-occurrence of consumption of an electrode | Generating state of arc |
| Com. Ex. 1 (Ar—15% He) | X | ○ | ○ | ○ |

TABLE 1-continued

| | Evaluation items | | | |
|---|---|---|---|---|
| | Penetration depth | Occurrence or non-occurrence of oxidation of bead | Occurrence or non-occurrence of consumption of an electrode | Generating state of arc |
| Ex. 1 (Ar—20% He) | Δ | ○ | ○ | ○ |
| Ex. 2 (Ar—25% He) | ○ | ○ | ○ | ○ |
| Ex. 3 (Ar—50% He) | ○ | ○ | ○ | ○ |
| Ex. 4 (Ar—75% He) | ⊚ | ○ | ○ | ○ |
| Ex. 5 (Ar—90% He) | ⊚ | ○ | ○ | Δ |
| Com. Ex. 2 (Ar—95% He) | ⊚ | ○ | Δ | X |

Comparative Example 2

Evaluation of Comparative Example 2 was performed using a first shield gas which had a helium ratio which was larger than that of the present invention. Concretely, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of consumption of an electrode, and a generation state of arc were performed.

In Comparative Example 2, welding conditions similar to those of Comparative Example 1 were used except that Ar-95% by volume of He was used as the first shield gas. Evaluation results of Comparative Example 2 are shown in Table 1.

Example 1

As Example 1, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of consumption of an electrode, and a generation state of arc were performed.

In Example 1, welding conditions similar to those of Comparative Example 1 were used except that Ar-20% by volume of He was used as the first shield gas. Evaluation results of Example 1 are shown in Table 1.

Example 2

As Example 2, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of consumption of an electrode, and generation condition of arc were performed.

In Example 2, welding conditions similar to those of Comparative Example 1 were used except that Ar-25% by volume of He was used as the first shield gas. Evaluation results of Example 1 are shown in Table 1.

Example 3

As Example 3, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of consumption of an electrode, and generation condition of arc were performed.

In Example 3, welding conditions similar to those of Comparative Example 1 were used except that Ar-50% by volume of He was used as the first shield gas. Evaluation results of Example 3 are shown in Table 1.

Example 4

As Example 4, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of consumption of an electrode, and generation condition of arc were performed.

In Example 4, welding conditions similar to those of Comparative Example 1 were used except that Ar-75% by volume of He was used as the first shield gas. Evaluation results of Example 4 are shown in Table 1.

Example 5

As Example 5, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and evaluations of penetration depth, occurrence or non-occurrence of oxidation of bead, occurrence or non-occurrence of consumption of an electrode, and generation condition of arc were performed.

In Example 5, welding conditions similar to those of Comparative Example 1 were used except that Ar-90% by volume of He was used as the first shield gas. Evaluation results of Example 5 are shown in Table 1.

Hereinafter, how to read the evaluation results of Table 1 is explained.

A penetration depth was decided such that; a case wherein a penetration depth was shallow and a penetration bead was not generated was shown by "x" (not acceptable); a case wherein a penetration bead was generated by penetration and the size of the penetration bead was in a range which exceeds 0 mm and was less than 1 mm was shown by "Δ" (acceptable); a case wherein the size of the penetration bead was in a range of 1 mm or more and less than 2 mm was shown by "o" (good); and a case wherein the penetration depth was 2 mm or more was shown by "⊚" (excellent).

Furthermore, whether or not oxidation of bead was occurred was decided such that; a case wherein oxidation of bead was confirmed is shown by "x" (not acceptable); and a case wherein oxidation of bead was not confirmed is shown by "o" (good). Whether or not oxidation of bead was occurred was visually confirmed.

Whether or not consumption of an electrode 15 was occurred was visually confirmed, and was also decided such that; a case wherein arc is not generated is shown by "x" (not acceptable); a case wherein a time was required to generate arc was shown by "Δ" (acceptable); and a case wherein stable arc was immediately generated was shown by "o" (good).

With respect to a generation state of arc, it was decided such that; a case wherein arc was not generated was shown by "x" (not acceptable); a case wherein a time was required to generate arc was shown by "Δ" (acceptable); and a case wherein stable arc was immediately generated was shown by "o" (good).

As shown in Table 1, in Comparative Example 1, sufficient penetration depth could not be obtained. On the other hand, in Example 1, although it was somewhat shallow, a penetration depth which was sufficient to perform welding was able to be achieved. Furthermore, in Examples 2 and 3, sufficient penetration depth was able to be achieved. Furthermore, it was confirmed that, when a first shield gas including 75% by volume of helium was used, a penetration depth was able to be further lowered.

Accordingly, it was confirmed that penetration depth became deep as the ratio of helium gas increased, and the sufficient penetration depth was able to be obtained when the ratio of helium gas included in the first shield gas was 20% by volume or more.

Oxidation of bead was not observed in all of Comparative Example 1, Examples 1 to 5 and Comparative Example 2, and excellent results were obtained.

With respect to the consumption of the electrode 15, the consumption of the electrode 15 was merely shown in Comparative Example 2 although the consumed amount thereof was small. Accordingly, it was confirmed that the amount of helium gas included in the first shield gas is required to be in a range of 15 to 90% by volume from the viewpoint of the consumption of the electrode 15.

With respect to the generating state of arc, excellent results were obtained in Comparative Example 1 and Examples 1 to 4. A state of generating arc in Example 5 was not good, but the state was not a degree which makes great effect on welding. Furthermore, arc was not generated in Comparative Example 2. Accordingly, it was confirmed that the amount of helium gas included in the first shield gas is required to be in a range of 15 to 90% by volume from the viewpoint of a state of generating arc.

From the evaluation results shown in Table 1, it was confirmed that, when the amount of helium gas included in the first shield gas which was a mixed gas of argon gas and helium gas was set to 20 to 90% by volume, it is possible to prevent occurrence of bead and oxidation, to reduce variation, and to obtain a sufficient penetration depth.

Furthermore, it was confirmed that, when the amount of helium gas included in the first shield gas, which was a mixed gas including argon gas and 20 to 90% by volume of helium gas, was set to 25 to 75% by volume, welding was able to be performed wherein the sufficient penetration depth was able to be achieved, oxidation of bead was able to be prevented, consumption of the electrode 15 was not caused, and excellent arc generation state was achieved.

(Evaluation of Welding Wherein the Flow Rate $S_2$ of the Second Shield Gas and the Flow Rate $S_1$ of the First Shield Gas Were Changed)

Example 6

Subsequently, welding of SUS430 having a thickness of 2 mm, which was used as a ferrite stainless steel sheet 11, was performed using a double-shielded-type welding torch 10 shown in FIG. 1 (a welding torch equipped with a tungsten electrode as an electrode 15), and the flow rate $S_1$ and the flow rate $S_2$ were changed to perform comprehensive evaluations with respect to penetration depth, occurrence or non-occurrence of oxidation of bead, occurrence or non-occurrence of consumption of an electrode, and a generating state of arc.

In the evaluations, Ar-20% by volume of He was used as the first shield gas, and Ar (single argon gas) was used as the second shield gas. Furthermore, as the flow rate $S_1$ of the first shield gas, 0 m/sec, 0.175 m/sec, 0.35 m/sec, 0.526 m/sec, 0.702 m/sec, 0.877 m/sec, 1.05 m/sec, 1.23 m/sec, 1.40 m/sec, 1.58 m/sec, and 1.75 m/sec were used, and evaluations were performed such that the flow rate $S_2$ of the second shield gas was changed with respect to each flow rate $S_1$.

Furthermore, as the flow rate $S_2$ of the second shield gas, 0 m/sec, 0.01 m/sec, 0.05 m/sec, 0.18 m/sec, 0.24 m/sec, 0.30 m/sec, 0.60 m/sec, 0.91 m/sec, 1.21 m/sec, 1.51 m/sec, and 1.81 m/sec were used The above evaluation results are shown in Table 2. Table 2 shows the results of comprehensive evaluations of penetration depth, occurrence or non-occurrence of oxidation of bead, occurrence or non-occurrence of consumption of an electrode, and a generation state of arc. In Table 2, a case wherein comprehensive evaluation results with respect to a TIG welding which was performed for a ferrite stainless steel sheet 11 were unproblematic levels was shown by "o" (good); a case wherein comprehensive evaluation results were levels wherein a TIG welding could not be performed for a ferrite stainless steel sheet 11 was shown by "x" (not acceptable); and a case wherein excellent evaluation results were achieved was shown by "⊙" (excellent).

TABLE 2

| | | Second flow rate $S_2$ (m/sec) | | | | | | | | | | |
|---|---|---|---|---|---|---|---|---|---|---|---|---|
| | | 0 | 0.01 | 0.05 | 0.18 | 0.24 | 0.30 | 0.60 | 0.91 | 1.21 | 1.51 | 1.81 |
| First flow rate $S_1$ (m/sec) | 0 | X | X | X | X | X | X | X | X | X | X | X |
| | 0.175 | X | X | X | X | O | O | O | X | X | X | X |
| | 0.35 | X | X | X | O | ⊙ | ⊙ | ⊙ | ⊙ | ⊙ | O | X |
| | 0.526 | X | X | X | O | ⊙ | ⊙ | ⊙ | ⊙ | ⊙ | O | X |
| | 0.702 | X | X | O | O | ⊙ | ⊙ | ⊙ | ⊙ | ⊙ | O | X |
| | 0.877 | X | X | O | O | ⊙ | ⊙ | ⊙ | ⊙ | ⊙ | O | X |
| | 1.05 | X | X | O | O | ⊙ | ⊙ | ⊙ | ⊙ | ⊙ | O | X |
| | 1.23 | X | X | O | O | ⊙ | ⊙ | ⊙ | ⊙ | ⊙ | O | X |
| | 1.40 | X | X | O | O | ⊙ | ⊙ | ⊙ | ⊙ | ⊙ | O | X |

TABLE 2-continued

| | | Second flow rate $S_2$ (m/sec) | | | | | | | | | |
|---|---|---|---|---|---|---|---|---|---|---|---|
| | | 0 | 0.01 | 0.05 | 0.18 | 0.24 | 0.30 | 0.60 | 0.91 | 1.21 | 1.51 | 1.81 |
| | 1.58 | X | X | ○ | ○ | ◎ | ◎ | ◎ | ◎ | ◎ | ○ | X |
| | 1.75 | X | X | ○ | ○ | ○ | ○ | ○ | ○ | ○ | ○ | X |

Example 7

Welding of SUS430 having a thickness of 2 mm, which was used as a ferrite stainless steel sheet 11, was performed under conditions similar to those described in experiments shown in Table 2, except that Ar-25% by volume of He was used as the first shield gas. Evaluations with respect to penetration depth, occurrence or non-occurrence of oxidation of bead, occurrence or non-occurrence of consumption of an electrode, and a generating state of arc were performed. The results of the evaluation are shown in Table 3.

TABLE 3

| | | Second flow rate $S_2$ (m/sec) | | | | | | | | | |
|---|---|---|---|---|---|---|---|---|---|---|---|
| | | 0 | 0.01 | 0.05 | 0.18 | 0.24 | 0.30 | 0.60 | 0.91 | 1.21 | 1.51 | 1.81 |
| First | 0 | X | X | X | X | X | X | X | X | X | X | X |
| flow | 0.175 | X | X | X | X | ○ | ○ | ○ | X | X | X | X |
| rate $S_1$ | 0.35 | X | X | X | ○ | ◎ | ◎ | ◎ | ◎ | ◎ | ○ | X |
| (m/sec) | 0.526 | X | X | ○ | ○ | ◎ | ◎ | ◎ | ◎ | ◎ | ○ | X |
| | 0.702 | X | X | ○ | ○ | ◎ | ◎ | ◎ | ◎ | ◎ | ○ | X |
| | 0.877 | X | X | ○ | ○ | ◎ | ◎ | ◎ | ◎ | ◎ | ○ | X |
| | 1.05 | X | X | ○ | ○ | ◎ | ◎ | ◎ | ◎ | ◎ | ○ | X |
| | 1.23 | X | X | ○ | ○ | ◎ | ◎ | ◎ | ◎ | ◎ | ○ | X |
| | 1.40 | X | X | ○ | ○ | ◎ | ◎ | ◎ | ◎ | ◎ | ○ | X |
| | 1.58 | X | X | ○ | ○ | ◎ | ◎ | ◎ | ◎ | ◎ | ○ | X |
| | 1.75 | X | X | ○ | ○ | ○ | ○ | ○ | ○ | ○ | ○ | X |

Example 8

Welding of SUS430 having a thickness of 2 mm, which was used as a ferrite stainless steel sheet 11, was performed under conditions similar to those described in experiments shown in Table 2, except that Ar-50% by volume of He was used as the first shield gas. Evaluations with respect to penetration depth, occurrence or non-occurrence of oxidation of bead, occurrence or non-occurrence of consumption of an electrode, and a generating state of arc were performed. The results of the evaluation are shown in Table 4.

TABLE 4

| | | Second flow rate $S_2$ (m/sec) | | | | | | | | | |
|---|---|---|---|---|---|---|---|---|---|---|---|
| | | 0 | 0.01 | 0.05 | 0.18 | 0.24 | 0.30 | 0.60 | 0.91 | 1.21 | 1.51 | 1.81 |
| First | 0 | X | X | X | X | X | X | X | X | X | X | X |
| flow | 0.175 | X | X | X | ○ | ○ | ○ | ○ | X | X | X | X |
| rate $S_1$ | 0.35 | X | X | ○ | ○ | ◎ | ◎ | ◎ | ◎ | ◎ | ○ | X |
| (m/sec) | 0.526 | X | X | ○ | ○ | ◎ | ◎ | ◎ | ◎ | ◎ | ○ | X |
| | 0.702 | X | X | ○ | ○ | ◎ | ◎ | ◎ | ◎ | ◎ | ○ | X |
| | 0.877 | X | X | ○ | ○ | ◎ | ◎ | ◎ | ◎ | ◎ | ○ | X |
| | 1.05 | X | X | ○ | ○ | ◎ | ◎ | ◎ | ◎ | ◎ | ○ | X |
| | 1.23 | X | X | ○ | ○ | ◎ | ◎ | ◎ | ◎ | ◎ | ○ | X |
| | 1.40 | X | X | ○ | ○ | ◎ | ◎ | ◎ | ◎ | ◎ | ○ | X |
| | 1.58 | X | X | ○ | ○ | ◎ | ◎ | ◎ | ◎ | ◎ | ○ | X |
| | 1.75 | X | X | ○ | ○ | ○ | ○ | ○ | ○ | ○ | ○ | X |

Example 9

Welding of SUS430 having a thickness of 2 mm, which was used as a ferrite stainless steel sheet 11, was performed under conditions similar to those described in experiments shown in Table 2 except that Ar-75% by volume of He was used as the first shield gas, and evaluations with respect to penetration depth, occurrence or non-occurrence of oxidation of bead, occurrence or non-occurrence of consumption of an electrode, and a generating state of arc were performed. The results of the evaluation are shown in Table 5.

TABLE 5

| | | Second flow rate $S_2$ (m/sec) | | | | | | | | | |
|---|---|---|---|---|---|---|---|---|---|---|---|
| | | 0 | 0.01 | 0.05 | 0.18 | 0.24 | 0.30 | 0.60 | 0.91 | 1.21 | 1.51 | 1.81 |
| First flow rate $S_1$ (m/sec) | 0 | X | X | X | X | X | X | X | X | X | X | X |
| | 0.175 | X | X | O | O | O | O | O | X | X | X | X |
| | 0.35 | X | X | O | ⊚ | ⊚ | ⊚ | ⊚ | ⊚ | ⊚ | O | X |
| | 0.526 | X | X | O | ⊚ | ⊚ | ⊚ | ⊚ | ⊚ | ⊚ | O | X |
| | 0.702 | X | X | O | ⊚ | ⊚ | ⊚ | ⊚ | ⊚ | ⊚ | O | X |
| | 0.877 | X | X | O | ⊚ | ⊚ | ⊚ | ⊚ | ⊚ | ⊚ | O | X |
| | 1.05 | X | X | O | ⊚ | ⊚ | ⊚ | ⊚ | ⊚ | ⊚ | O | X |
| | 1.23 | X | X | O | ⊚ | ⊚ | ⊚ | ⊚ | ⊚ | ⊚ | O | X |
| | 1.40 | X | X | O | ⊚ | ⊚ | ⊚ | ⊚ | ⊚ | ⊚ | O | X |
| | 1.58 | X | X | O | ⊚ | ⊚ | ⊚ | ⊚ | ⊚ | ⊚ | O | X |
| | 1.75 | X | X | O | O | O | O | O | O | O | O | X |

Example 10

Welding of SUS430 having a thickness of 2 mm, which was used as a ferrite stainless steel sheet 11, was performed under conditions similar to those described in experiments shown in Table 2, except that Ar-90% by volume of He was used as the first shield gas. Evaluations with respect to penetration depth, occurrence or non-occurrence of oxidation of bead, occurrence or non-occurrence of consumption of an electrode, and generating state of arc were performed. The results of the evaluation are shown in Table 6.

TABLE 6

| | | Second flow rate $S_2$ (m/sec) | | | | | | | | | |
|---|---|---|---|---|---|---|---|---|---|---|---|
| | | 0 | 0.01 | 0.05 | 0.18 | 0.24 | 0.30 | 0.60 | 0.91 | 1.21 | 1.51 | 1.81 |
| First flow rate $S_1$ (m/sec) | 0 | X | X | X | X | X | X | X | X | X | X | X |
| | 0.175 | X | X | O | O | O | O | O | X | X | X | X |
| | 0.35 | X | X | O | ⊚ | ⊚ | ⊚ | ⊚ | ⊚ | ⊚ | O | X |
| | 0.526 | X | X | O | ⊚ | ⊚ | ⊚ | ⊚ | ⊚ | ⊚ | O | X |
| | 0.702 | X | X | O | ⊚ | ⊚ | ⊚ | ⊚ | ⊚ | ⊚ | O | X |
| | 0.877 | X | X | O | ⊚ | ⊚ | ⊚ | ⊚ | ⊚ | ⊚ | O | X |
| | 1.05 | X | X | O | ⊚ | ⊚ | ⊚ | ⊚ | ⊚ | ⊚ | O | X |
| | 1.23 | X | X | O | ⊚ | ⊚ | ⊚ | ⊚ | ⊚ | ⊚ | O | X |
| | 1.40 | X | X | O | ⊚ | ⊚ | ⊚ | ⊚ | ⊚ | ⊚ | O | X |
| | 1.58 | X | X | O | ⊚ | ⊚ | ⊚ | ⊚ | ⊚ | ⊚ | O | X |
| | 1.75 | X | X | O | O | O | O | O | O | O | O | X |

(Evaluation Results of a Case Wherein the Flow Rate $S_2$ was Changed While the Flow Rate $S_1$ was Fixed to 0 m/sec.)

As shown in Tables 2 to 6, when the flow rate $S_2$ of the second shield gas was changed in a range of 0 to 1.81 m/sec while the flow rate $S_1$ was fixed to 0 m/sec, generation of arc was instable, and stable bead was not obtained. Accordingly, suitable effects were not obtained.

(Evaluation Results of a Case Wherein the Flow Rate $S_2$ and a Helium Concentration Were Changed While the Flow Rate $S_1$ was Fixed to 0.175 m/sec.)

As shown in Tables 2 and 3, when Ar-20% by volume of He or Ar-25% by volume of He was used as the first shield gas, excellent bead having a stable penetration bead was not obtained under the condition that the flow rate $S_2$ of the second shield gas was included in a range of 0 to 0.18 m/sec, and in a range of 0.91 to 1.81 m/sec. Here, a penetration bead means an underside bead generated at the underside of the stainless steel. That is, the aforementioned conditions were conditions which could not be employed for TIG welding for a ferrite stainless steel sheet 11.

When Ar-20% by volume of He or Ar-25% by volume of He was used as the first shield gas and the flow rate $S_2$ of the second shield gas was included in a range of 0.24 to 0.6 m/sec, somewhat irregular bead was formed but the level thereof was an unproblematic level for a TIG welding performed for a ferrite stainless steel sheet 11.

As shown in Table 4, when Ar-50% by volume of He was used as the first shield gas and the flow rate $S_2$ of the second shield gas was included in a range of 0 to 0.05 m/sec or 0.91 to 1.81 m/sec, excellent bead having a stable penetration bead was not obtained. That is, the aforementioned conditions were conditions which could not be employed for a TIG welding for a ferrite stainless steel sheet 11.

Furthermore, when Ar-50% by volume of He was used as the first shield gas and the flow rate $S_2$ of the second shield gas was included in a range of 0.18 to 0.60 m/sec, somewhat irregular bead was formed but the level thereof was an unproblematic level for a TIG welding performed for a ferrite stainless steel sheet 11.

As shown in Tables 5 and 6, when Ar-75% by volume of He or Ar-90% by volume of He was used as the first shield gas and the flow rate $S_2$ of the second shield gas was included in a range of 0 to 0.01 m/sec or 0.91 to 1.81 m/sec, excellent bead having a stable penetration bead was not obtained. That is, the aforementioned conditions were conditions which could not be employed for a TIG welding for a ferrite stainless steel sheet 11.

Furthermore, when Ar-75% by volume of He or Ar-90% by volume of He was used as the first shield gas and the flow rate $S_2$ of the second shield gas was included in a range of 0.05 to 0.60 m/sec, somewhat irregular bead was formed but the level thereof was an unproblematic level for a TIG welding performed for a ferrite stainless steel sheet 11.

(Evaluation Results of a Case Wherein the Flow Rate $S_2$ and a Hellion Concentration Were Changed While the Flow Rate $S_1$ was Fixed to 0.35 m/sec.)

As shown in Tables 2 and 3, when Ar-20% by volume of He or Ar-25% by volume of He was used as the first shield gas, continuous penetration bead was not obtained under the condition that the flow rate $S_2$ of the second shield gas was included in a range of 0 to 0.05 m/sec, or was 1.81 m/sec. That is, the aforementioned conditions were conditions which could not be employed for TIG welding for a ferrite stainless steel sheet 11.

Furthermore, when Ar-20% by volume of He or Ar-25% by volume of He was used as the first shield gas and the flow rate $S_2$ of the second shield gas was 0.18 m/sec or 1.51 in/sec, a stable penetration bead was obtained although the penetration bead was narrow, and the level thereof was an unproblematic level for a TIG welding performed for a ferrite stainless steel sheet 11.

Furthermore, when Ar-20% by volume of He or Ar-25% by volume of He was used as the first shield gas and the flow rate $S_2$ of the second shield gas was in a range of 0.24 to 1.21 m/sec, excellent results were obtained.

As shown in Table 4, when Ar-50% by volume of He or Ar-25% by volume of He was used as the first shield gas, continuous penetration bead was not obtained under the condition that the flow rate $S_2$ of the second shield gas was included in a range of 0 to 0.01 m/sec, or was 1.81 in/sec. That is, the aforementioned conditions were conditions which could not be employed for TIG welding for a ferrite stainless steel sheet 11.

Furthermore, when Ar-50% by volume of He was used as the first shield gas and the flow rate $S_2$ of the second shield gas was 0.05 to 0.18 m/sec or 1.51 m/sec, a stable penetration bead was obtained although the penetration bead was narrow, and the level thereof was an unproblematic level for a TIG welding performed for a ferrite stainless steel sheet 11.

Furthermore, when Ar-50% by volume of He was used as the first shield gas and the flow rate $S_2$ of the second shield gas was in a range of 0.24 to 1.21 m/sec, excellent results were obtained.

As shown in Tables 5 and 6, when Ar-75% by volume of He or Ar-90% by volume of He was used as the first shield gas, continuous penetration bead was not obtained under the condition that the flow rate $S_2$ of the second shield gas was included in a range of 0 to 0.01 m/sec, or was 1.81 m/sec. That is, the aforementioned conditions were conditions which could not be employed for TIG welding for a ferrite stainless steel sheet 11.

Furthermore, when Ar-75% by volume of He or Ar-90% by volume of He was used as the first shield gas and the flow rate $S_2$ of the second shield gas was 0.05 m/sec or 1.51 m/sec, a stable penetration bead was obtained although the penetration bead was narrow, and the level thereof was an unproblematic level for a TIG welding performed for a ferrite stainless steel sheet 11.

Furthermore, when Ar-75% by volume of He or Ar-90% by volume of He was used as the first shield gas and the flow rate $S_2$ of the second shield gas was in a range of 0.18 to 1.21 m/sec, excellent results were obtained.

(Evaluation Results of a Case Wherein the Flow Rate $S_2$ and a Helium Concentration Were Changed While the Flow Rate $S_1$ was Fixed to 0.526 m/sec.)

As shown in Table 2, when Ar-20% by volume of He was used as the first shield gas, continuous penetration bead was not obtained under the condition that the flow rate $S_2$ of the second shield gas was included in a range of 0 to 0.05 m/sec, or was 1.81 m/sec. That is, the aforementioned conditions were conditions which could not be employed for TIG welding for a ferrite stainless steel sheet 11.

Furthermore, when Ar-20% by volume of He was used as the first shield gas and the flow rate $S_2$ of the second shield gas was 0.18 m/sec or 1.51 m/sec, a stable penetration bead was obtained although the penetration bead was narrow, and the level thereof was an unproblematic level for a TIG welding performed for a ferrite stainless steel sheet 11.

Furthermore, when Ar-20% by volume of He was used as the first shield gas and the flow rate $S_2$ of the second shield gas was in a range of 0.24 to 1.21 m/sec, excellent results were obtained.

As shown in Tables 3 and 4, when Ar-25% by volume of He or Ar-50% by volume of He was used as the first shield gas, continuous penetration bead was not obtained under the condition that the flow rate $S_2$ of the second shield gas was included in a range of 0 to 0.01 m/sec, or was 1.81 m/sec. That is, the aforementioned conditions were conditions which could not be employed for TIG welding for a ferrite stainless steel sheet 11.

Furthermore, when Ar-25% by volume of He or Ar-50% by volume of He was used as the first shield gas and the flow rate $S_2$ of the second shield gas was in a range of 0.05 to 0.18 m/sec or 1.51 m/sec, a stable penetration bead was obtained although the penetration bead was narrow, and the level thereof was an unproblematic level for a TIG welding performed for a ferrite stainless steel sheet 11.

Furthermore, when Ar-25% by volume of He or Ar-50% by volume of He was used as the first shield gas and the flow rate $S_2$ of the second shield gas was in a range of 0.24 to 1.21 m/sec, excellent results were obtained.

As shown in Tables 5 and 6, when Ar-75% by volume of He or Ar-90% by volume of He was used as the first shield gas, continuous penetration bead was not obtained under the condition that the flow rate $S_2$ of the second shield gas was included in a range of 0 to 0.01 m/sec, or was 1.81 m/sec. That is, the aforementioned conditions were conditions which could not be employed for TIG welding for a ferrite stainless steel sheet 11.

Furthermore, when Ar-75% by volume of He or Ar-90% by volume of He was used as the first shield gas and the flow rate $S_2$ of the second shield gas was 0.05 m/sec or 1.51 m/sec, a stable penetration bead was obtained although the penetration bead was narrow, and the level thereof was an unproblematic level for a TIG welding performed for a ferrite stainless steel sheet 11.

Furthermore, when Ar-75% by volume of He or Ar-90% by volume of He was used as the first shield gas and the flow rate $S_2$ of the second shield gas was in a range of 0.18 to 1.21 m/sec, excellent results were obtained.

(Evaluation Results of a Case Wherein the Flow Rate $S_2$ and a Helium Concentration Were Changed While the Flow Rate $S_1$ was Fixed to 0.702 m/sec.)

As shown in Tables 2 to 4, when any of Ar-20% by volume of He, Ar-25% by volume of He and Ar-50% by volume of He was used as the first shield gas, continuous penetration bead was not obtained under the condition that the flow rate $S_2$ of the second shield gas was included in a range of 0 to 0.01 m/sec, or was 1.81 m/sec. That is, the aforementioned conditions were conditions which could not be employed for TIG welding for a ferrite stainless steel sheet 11.

Furthermore, when any of Ar-20% by volume of He, Ar-25% by volume of He and Ar-50% by volume of He was used as the first shield gas and the flow rate $S_2$ of the second shield gas was 0.05 to 0.18 m/sec or 1.51 m/sec, a stable penetration bead was obtained although the penetration bead was narrow, and the level thereof was an unproblematic level for a TIG welding performed for a ferrite stainless steel sheet 11.

Furthermore, when any of Ar-20% by volume of He, Ar-25% by volume of He and Ar-50% by volume of He was used as the first shield gas and the flow rate $S_2$ of the second shield gas was in a range of 0.24 to 1.21 m/sec, excellent results were obtained.

As shown in Tables 5 and 6, when Ar-75% by volume of He or Ar-90% by volume of He was used as the first shield gas, continuous penetration bead was not obtained under the condition that the flow rate $S_2$ of the second shield gas was included in a range of 0 to 0.01 m/sec, or was 1.81 m/sec. That is, the aforementioned conditions were conditions which could not be employed for TIG welding for a ferrite stainless steel sheet 11.

Furthermore, when Ar-75% by volume of He or Ar-90% by volume of He was used as the first shield gas as the first shield gas and the flow rate $S_2$ of the second shield gas was 0.05 m/sec or 1.51 m/sec, a stable penetration bead was obtained although the penetration bead was narrow, and the level thereof was an unproblematic level for a TIG welding performed for a ferrite stainless steel sheet 11.

Furthermore, when Ar-75% by volume of He or Ar-90% by volume of He was used as the first shield gas and the flow rate $S_2$ of the second shield gas was in a range of 0.18 to 1.21 m/sec, excellent results were obtained.

(Evaluation Results of a Case Wherein the Flow Rate $S_2$ and a Helium Concentration Were Changed While the Flow Rate $S_1$ was Fixed to 0.877 m/sec.)

As shown in Tables 2 to 4, when any of Ar-20% by volume of He, Ar-25% by volume of He and Ar-50% by volume of He was used as the first shield gas, results were obtained which were similar to those of the case wherein the flow rate $S_2$ of the second shield gas was 0.702 m/sec.

That is, when the flow rate $S_2$ of the second shield gas was in a range of 0 to 0.01 m/sec, or was 1.81 m/sec, a TIG welding was not performed for a ferrite stainless steel sheet 11. When the flow rate $S_2$ of the second shield gas was in a range of 0.05 to 0.18 m/sec or was 1.51 m/sec, the results were an unproblematic level for a TIG welding performed for a ferrite stainless steel sheet 11. When the flow rate $S_2$ of the second shield gas was in a range of 0.24 to 1.21 m/sec, excellent results were obtained.

As shown in Tables 5 and 6, when Ar-75% by volume of He or Ar-90% by volume of H was used as the first shield gas, results were obtained which were similar to those of the case wherein the flow rate $S_2$ of the second shield gas was 0.702 m/sec.

That is, when the flow rate $S_2$ of the second shield gas was in a range of 0 to 0.01 m/sec, or was 1.81 m/sec, a TIG welding was not performed for a ferrite stainless steel sheet 11. When the flow rate $S_2$ of the second shield gas was 0.05 m/sec or was 1.51 m/sec, the results were an unproblematic level for a TIG welding performed for a ferrite stainless steel sheet 11. When the flow rate $S_2$ of the second shield gas was in a range of 0.18 to 1.21 m/sec, excellent results were obtained.

(Evaluation Results of a Case Wherein the Flow Rate $S_2$ and a Helium Concentration Were Changed While the Flow Rate $S_1$ was Fixed to Any of 1.05 m/sec, 1.23 m/sec, 1.40 m/sec or 1.58 m/sec.)

As shown in Tables 2 to 4, when any of Ar-20% by volume of He, Ar-25% by volume of He and Ar-50% by volume of He was used as the first shield gas, results were obtained which were similar to those of the case wherein the flow rate $S_2$ of the second shield gas was 0.702 m/sec.

As shown in Tables 5 and 6, when Ar-75% by volume of He oar Ar-90% by volume of He was used as the first shield gas, results were obtained which were similar to those of the case wherein the flow rate $S_2$ of the second shield gas was 0.702 m/sec.

(Evaluation Results of a Case Wherein the Flow Rate $S_2$ and a Helium Concentration Were Changed While the Flow Rate $S_1$ was Fixed to 1.75 m/sec.)

As shown in Tables 2 to 6, when any of Ar-20% by volume of He, Ar-25% by volume of He, Ar-50% by volume of He, Ar-75% by volume of He and Ar-90% by volume of He was used as the first shield gas, continuous penetration bead was not obtained under the condition that the flow rate $S_2$ of the second shield gas was included in a range of 0 to 0.01 m/sec, or was 1.81 m/sec. That is, the aforementioned conditions were conditions which could not be employed for TIG welding for a ferrite stainless steel sheet 11.

Furthermore, when any of Ar-20% by volume of He, Ar-25% by volume of He, Ar-50% by volume of He, Ar-75% by volume of He and Ar-90% by volume of He was used as the first shield gas and the flow rate $S_2$ of the second shield gas was included in a range of 0.05 to 1.5 m/sec, a stable penetration bead was obtained although the penetration bead was narrow, and the level thereof was an unproblematic level for a TIG welding performed for a ferrite stainless steel sheet 11.

According to the results described above, it was confirmed that cost can be reduced, a shield effect used to inhibit oxidation can be increased, and sufficient penetration depth can be achieved, when TIG welding for a ferrite stainless steel sheet 11 was performed using a double-shield type welding torch 10 shown in FIG. 1 under the following conditions. The conditions includes; a mixed gas used as a first shield gas is a mixture of argon gas and helium gas, includes 20 to 90% by volume of helium, and was used under the condition that the flow rate $S_1$ of the first shield gas was set in a range of 0.175 m/sec$\leq S_1 \leq$1.75 m/sec; and argon gas was used as the second shield gas under the condition that the flow rate $S_2$ of the second shield gas was set in a range of 0.05 m/sec$\leq S_1 \leq$1.51 m/sec.

Furthermore, it was confirmed that the arc concentration was improved and suitable continuous penetration beads were able to be obtained when the first flow rate $S_1$ was set to 0.35 m/sec$\leq S_1 \leq$1.58 m/sec and the second flow rate $S_2$ was set to 0.24 m/sec$\leq S_1 \leq$1.21 m/sec, since the first flow rate $S_1$ and the second flow rate $S_2$ were able to be maintained in the appropriate range.

Furthermore, when the outer flow rate $S_2$ (the second flow rate) exceeded a certain limit, such a flow rate caused the intrusion into the inner flow rate (the first flow rate), and sufficient penetration bead (penetration) was not obtained.

INDUSTRIAL APPLICABILITY

The present invention provides a TIG welding method for a ferrite stainless steel sheet which can reduce cost, can increase shield effects to inhibit oxidation, and can obtain sufficient penetration depth. The purpose describe above has been achieved by the present invention.

The present invention can be used as a TIG welding method for a ferrite stainless steel sheet which can reduce cost, can increase shield effects to inhibit oxidation, and can obtain sufficient penetration depth.

BRIEF DESCRIPTION OF THE REFERENCE SYMBOLS

10 Double-shielded-type welding torch
11 Ferrite stainless steel sheet
15 Electrode
15A Tip
21 First channel
22 Second channel

The invention claimed is:

1. A TIG welding method for a ferrite stainless steel sheet, wherein
the method uses a welding torch, and
the welding torch includes:
an electrode which has a tip which generates arc;
a first shield nozzle which surrounds the electrode; and
a second shield nozzle provided at the outside of the first shield nozzle; wherein
a first shield gas is supplied from the inside of the first shield nozzle toward the tip of the electrode,
a second shield gas is supplied from an area between the first shield nozzle and the second shield nozzle toward the tip of the electrode;
the first shield gas is a mixed gas which is a mixture of argon gas and helium gas, wherein 20 to 90% by volume of helium is included in the mixture, and the flow velocity $S_1$ of the first shield gas is set to 0.175 m/sec≤$S_1$≤1.75 m/sec, and
the second shield gas consisting essentially of argon gas, and the flow velocity $S_2$ of the second shield gas is set to 0.05 m/sec≤$S_2$≤1.51 m/sec.

2. The TIG welding method for a ferrite stainless steel sheet according to claim 1, wherein the flow velocity $S_1$ is set to 0.35 m/sec≤$S_1$≤1.58 m/sec, and the flow velocity $S_2$ is set to 0.24 m/sec≤$S_2$≤1.21 m/sec.

3. The TIG welding method for a ferrite stainless steel sheet according to claim 1, wherein the mixture includes 25 to 75% by volume of helium gas.

4. The TIG welding method for a ferrite stainless steel sheet according to claim 1, wherein the electrode is a tungsten electrode.

5. The TIG welding method for a ferrite stainless steel sheet according to claim 1, wherein the first shield nozzle and the second shield nozzle have a tubular form.

6. The TIG welding method for a ferrite stainless steel sheet according to claim 1, wherein
the lower end of the first shield nozzle and the lower end of the second shield nozzle are substantially parallel to each other, and
the tip of the electrode protrudes from the nozzle.

7. The TIG welding method for a ferrite stainless steel sheet according to claim 1, wherein 40 to 90% by volume of helium gas is included in the mixture.

8. The TIG welding method for a ferrite stainless steel sheet according to claim 1, wherein 30 to 80% by volume of helium gas is included in the mixture.

9. The TIG welding method for a ferrite stainless steel sheet according to claim 1, wherein 20 to 50% by volume of helium gas is included in the mixture.

10. The TIG welding method for a ferrite stainless steel sheet according to claim 1, wherein the minimum flow velocity $S_1$ is 0.35 m/sec.

11. The TIG welding method for a ferrite stainless steel sheet according to claim 1, wherein the maximum flow velocity $S_1$ is 1.586 m/sec.

12. The TIG welding method for a ferrite stainless steel sheet according to claim 1, wherein the maximum flow velocity $S_1$ is 1.40 m/sec.

13. The TIG welding method for a ferrite stainless steel sheet according to claim 1, wherein the minimum flow velocity $S_2$ is 0.18 m/sec.

14. The TIG welding method for a ferrite stainless steel sheet according to claim 1, wherein the maximum flow velocity $S_2$ is 1.21 m/sec.

15. The TIG welding method for a ferrite stainless steel sheet according to claim 1, wherein the ferrite stainless steel sheet includes 0.3% or less of carbon, and includes 11 to 28% of chromium.

16. The TIG welding method for a ferrite stainless steel sheet according to claim 1, wherein the tip of the electrode protrudes from the nozzle, and the protruded length of the electrode is 15 mm or less.

* * * * *